United States Patent
Shan et al.

(10) Patent No.: US 11,911,961 B1
(45) Date of Patent: Feb. 27, 2024

(54) ADDITIVE MANUFACTURING DEVICE FOR AEROSPACE TRUSS

(71) Applicant: NANJING UNIVERSITY OF AERONAUTICS AND ASTRONAUTICS, Nanjing (CN)

(72) Inventors: Zhongde Shan, Nanjing (CN); Congze Fan, Nanjing (CN); Jinghua Zheng, Nanjing (CN); Wenzhe Song, Nanjing (CN); Yiwei Chen, Nanjing (CN); Kai Liu, Nanjing (CN)

(73) Assignee: NANJING UNIVERSITY OF AERONAUTICS AND ASTRONAUTICS, Nanjing (CN)

( * ) Notice: Subject to any disclaimer, the term of this patent is extended or adjusted under 35 U.S.C. 154(b) by 0 days.

(21) Appl. No.: 18/242,529

(22) Filed: Sep. 6, 2023

Related U.S. Application Data

(63) Continuation of application No. PCT/CN2023/077080, filed on Feb. 20, 2023.

(30) Foreign Application Priority Data

Oct. 28, 2022 (CN) .......................... 202211334837.0

(51) Int. Cl.
*B29C 64/218* (2017.01)
*B29C 64/236* (2017.01)
(Continued)

(52) U.S. Cl.
CPC .......... *B29C 64/218* (2017.08); *B29C 64/236* (2017.08); *B29C 64/295* (2017.08);
(Continued)

(58) Field of Classification Search
CPC ... B29C 64/218; B29C 64/295; B29C 64/236; B33Y 30/00; B33Y 80/00; B29L 2031/3097
(Continued)

(56) References Cited

U.S. PATENT DOCUMENTS

| 2017/0036783 A1* | 2/2017 | Snyder .................. B23K 9/044 |
| 2018/0250850 A1 | 9/2018 | Chen-Iun-Tai |

(Continued)

FOREIGN PATENT DOCUMENTS

| CN | 113263723 A * | 8/2021 | ............ B29C 64/20 |
| CN | 113263723 A | 8/2021 | |

OTHER PUBLICATIONS

Tian et al., CN113263723A, machine translation to English, 2021. (Year: 2021).*

*Primary Examiner* — Nahida Sultana
*Assistant Examiner* — Lawrence D. Hohenbrink, Jr.
(74) *Attorney, Agent, or Firm* — Bayramoglu Law Offices LLC

(57) ABSTRACT

An additive manufacturing device for an aerospace truss includes a raw material input unit, a longitudinal beam forming unit, a longitudinal beam traction unit, a cross beam forming unit and a truss support unit. The raw material input unit stores pre-impregnated wires and pre-impregnated tapes, and a motor drives rollers to convey the pre-impregnated wires and the pre-impregnated tapes forward; the longitudinal beam forming unit is composed of three sets of forming molds, and the pre-impregnated tapes form V-shaped longitudinal beams through heating molds; a stepper motor used in the longitudinal beam traction unit drives three sets of roller traction devices through steering gears to pull formed longitudinal beams; the cross beam forming unit is composed of a motion module and a printing module, and a truss cross beam is printed through a 3D printing method of molten deposition.

9 Claims, 4 Drawing Sheets

(51) Int. Cl.
*B29C 64/295* (2017.01)
*B29L 31/30* (2006.01)
*B33Y 30/00* (2015.01)
*B33Y 80/00* (2015.01)

(52) U.S. Cl.
CPC ....... *B29L 2031/3097* (2013.01); *B33Y 30/00* (2014.12); *B33Y 80/00* (2014.12)

(58) Field of Classification Search
USPC ........................................................ 425/110
See application file for complete search history.

(56) References Cited

U.S. PATENT DOCUMENTS

| | | |
|---|---|---|
| 2021/0122111 A1 | 4/2021 | Almousa et al. |
| 2021/0349441 A1 | 11/2021 | Elber et al. |
| 2023/0321903 A1* | 10/2023 | Church .................. B64G 1/222 244/172.6 |

* cited by examiner

US 11,911,961 B1

ADDITIVE MANUFACTURING DEVICE FOR AEROSPACE TRUSS

CROSS REFERENCE TO THE RELATED APPLICATIONS

This application is the continuation application of International Application No. PCT/CN2023/077080, filed on Feb. 20, 2023, which is based upon and claims priority to Chinese Patent Application No. 202211334837.0, filed on Oct. 28, 2022, the entire contents of which are incorporated herein by reference.

TECHNICAL FIELD

The present invention relates to the field of additive manufacturing devices, and in particular, to an additive manufacturing device for an aerospace truss.

BACKGROUND

At present, composite trusses are mostly manufactured by machining truss components with molds and then bonding the truss components, so the process is cumbersome and a truss structure cannot be formed once. Truss structures formed by layering require manual preparation, with long processing cycle, poor product consistency, and inconsistent resin and fiber statuses inside trusses.

At present, technologies for forming trusses by additive manufacturing are still being developed, relevant devices are not yet mature, and there is no additive manufacturing device for an aerospace truss. The manufacturing device proposed in the present invention achieves rapid in-situ formation of composite trusses, with good forming effect and high efficiency.

SUMMARY

To solve the above problems, the present invention discloses an additive manufacturing device for an aerospace truss, which can efficiently complete the formation of space trusses for satellite use.

An additive manufacturing device for an aerospace truss includes a raw material input unit, a longitudinal beam forming unit, a longitudinal beam traction unit, a cross beam forming unit and a truss support unit arranged sequentially.

The raw material input unit includes an upper roller, a lower roller located below the upper roller, several conveying pressure rollers arranged sequentially from top to bottom, and a guide plate, where one end of the conveying pressure roller is connected to a feeding stepper motor.

The upper roller stores tapes for forming longitudinal beams; and the lower roller stores wires for printing a cross beam. A feeding portion is composed of a feeding stepper motor and conveying pressure rollers, where the feeding stepper motor drives the conveying pressure rollers to convey raw materials. A guide plate portion is composed of a plurality of rollers, and adjusts the direction and position of the used tapes to prepare for forming.

The longitudinal beam forming unit includes three mold sets, which are arranged in a triangle; each mold set includes several molds, heating rods, a ceramic tube and a support plate, and is connected to the support plate through the ceramic tube; the heating rods are mounted in holes of the molds; each mold has an upper mold structure and a lower mold structure, which form a channel with a V-shaped angle; the V-shaped angle in each mold set gradually decreases from front to back; the three mold sets are arranged in a triangle and connected to the support plates through the ceramic tubes; and the pre-impregnated tapes passing through the molds form the required longitudinal beams by controlling the temperature of the molds.

The longitudinal beam traction unit includes a traction stepper motor, a coupling, a transmission shaft and an upper support frame; wing plates are distributed on two sides of the upper support frame; an angle between each wing plate and a middle plate of the upper support frame is 60°, and each wing plate has two through holes for fixing an upper power output shaft and an upper driven shaft that are arranged in parallel; the other end of the left upper power output shaft is arranged on a left support plate and connected to a bevel gear I; the other end of the right upper power output shaft is arranged on a right support plate and connected to a bevel gear II; a gear I and a concave wheel I are sequentially arranged on each upper power output shaft; a gear II and a convex wheel I that cooperate with the gear I and the concave wheel I are sequentially arranged on the upper driven shaft; the stepper motor is connected to the transmission shaft through the coupling; the transmission shaft is sequentially mounted on the left support plate and the right support plate; a bevel gear III and a bevel gear that mesh with the bevel gear I and the bevel gear II separately are sequentially arranged on the transmission shaft; a lower driven shaft parallel to the transmission shaft is mounted on the left support plate; a gear III and a convex wheel II are sequentially arranged on the lower driven shaft; the gear III and the convex wheel II cooperate with a gear IV and a concave wheel II on the transmission shaft separately; and a center line of the convex wheel II is coaxial with a center of the middle plate of the upper support frame.

The traction stepper motor drives the transmission shaft through the coupling, so as to drive meshing between the bevel gears and the gears, enable the convex and concave rollers to move simultaneously and pull the printed truss longitudinal beams.

The cross beam forming unit is composed of a motion module and a printing module; the truss support unit is composed of support conveying rollers and a support frame; a support conveying roller is arranged at each end of the support frame; and a shape of the support conveying rollers matches an inner surface of the truss longitudinal beam.

Further improvement of the present invention: the printing module is arranged on a slider of the motion module; the motion module is a screw linear guide mechanism; and the printing module includes a printing assembly and a nozzle arranged on the printing assembly.

When the longitudinal beams are formed, the motion module moves simultaneously, and the printing module on the motion module begins to work to print a cross beam between the two longitudinal beams.

Further improvement of the present invention: three cross beam forming units are configured; and the three cross beam forming units are parallel to three sides of the truss and perpendicular to the longitudinal beams of the truss.

Further improvement of the present invention: a gap between the concave wheel I and the convex wheel I is 0.2 mm to 3 mm; and a gap between the concave wheel II and the convex wheel II is 0.2 mm to 3 mm.

Further improvement of the present invention: each mold set includes three molds; and the V-shaped angles in the mold sets are 120°, 90°, and 60°, respectively.

Every two molds in each mold set are spaced by 20 mm to 40 mm. The mold has an upper mold structure and a lower mold structure in a V shape, and angles between flow channels of the molds are different, so that the 180° pre-impregnated tapes gradually transform into longitudinal beams with an angle of 60°. Taking each set of three molds as an example, the angles between the three molds are sequentially 120°, 90°, and 600 in the movement direction of the pre-impregnated tapes. A heating rod and a temperature sensor are mounted on the upper mold of each mold, and the upper and lower molds are connected by bolts.

Further improvement of the present invention: the concave wheel I and the concave wheel II are recessed in a 60° V shape; the convex wheel I and the convex wheel II are raised in a 60° V shape; and the shapes match the structural shape of the truss.

Further improvement of the present invention: rubber layers are arranged on surfaces of the concave wheel I and the concave wheel II, and rubber layers are arranged on surfaces of the convex wheel I and the convex wheel, to protect printed materials.

Further improvement of the present invention: the upper support frame, the left support frame and the right support frame are all made of carbon fiber boards.

Further improvement of the present invention: the coupling is an elastic coupling, which improves operational stability.

Beneficial effects of the present invention are as follows: rapid in-situ formation of composite trusses is achieved, with good forming effect and high efficiency; and the stability is improved.

DETAILED DESCRIPTION OF THE EMBODIMENTS

Figure 1:
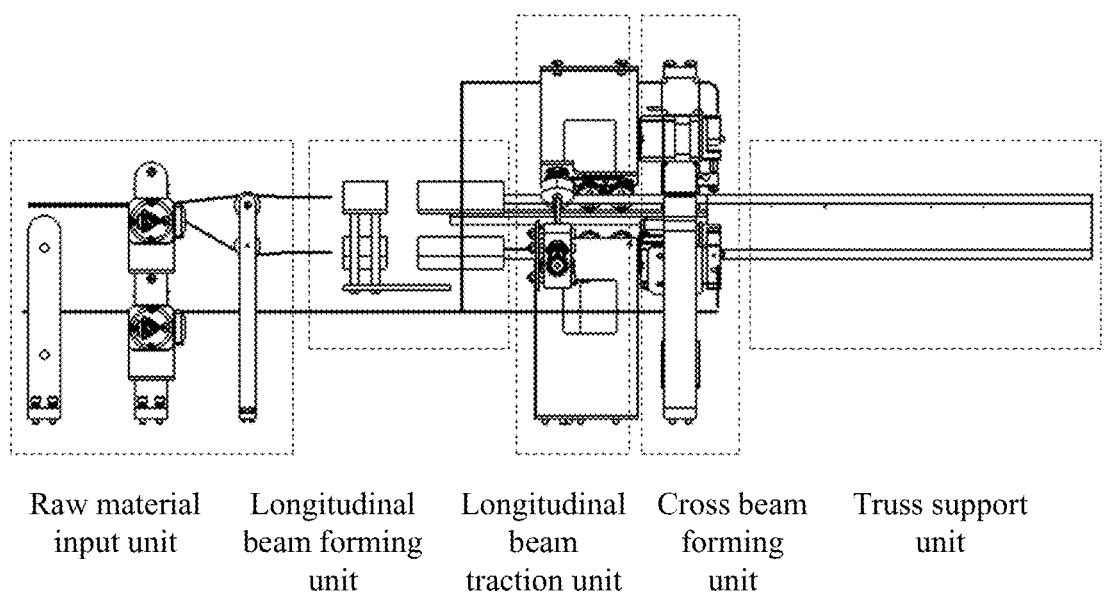
FIG. 1 is a schematic diagram of an overall design scheme of a device.

The present invention will be further illustrated below in conjunction with the accompanying drawings and specific embodiments. It should be understood that the following specific embodiments are only used for describing the present invention, rather than limiting the scope of the present invention. It should be noted that the terms "front", "back", "left", "right", "upper" and "lower" used in the following description refer to directions in the drawings, and the terms "inside" and "outside" refer to a direction toward or away from a geometric center of a specific component separately.

As shown in FIG. 1, an additive manufacturing device for an aerospace truss includes a raw material input unit, a longitudinal beam forming unit, a longitudinal beam traction unit, a cross beam forming unit and a truss support unit arranged sequentially.

Figure 2:
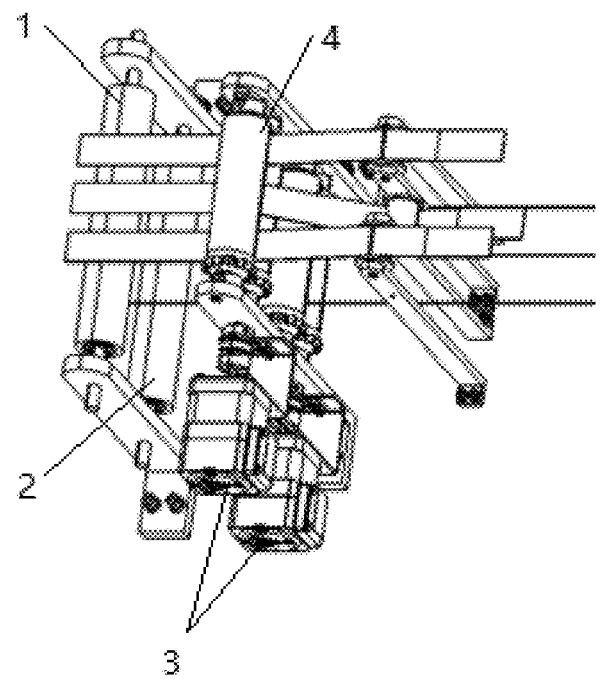
FIG. 2 is a schematic diagram of a raw material input unit.

As shown in FIG. 2, the raw material input unit includes an upper roller 1, a lower roller 2 located below the upper roller 1, several conveying pressure rollers 4 arranged sequentially from top to bottom, and a guide plate. One end of the conveying pressure roller 4 is connected to a feeding stepper motor 3.

A storage portion of the raw material input unit is composed of brackets and rollers, two longitudinal brackets are fixed on a plane, two transverse brackets are vertically distributed in parallel and equidistantly on the longitudinal brackets, and two rollers are sheathed on the two longitudinal brackets separately. Three groove-like structures are equidistantly arranged in the two rollers in a rotation direction, upper roller grooves store pre-impregnated tapes in three directions separately, and lower roller grooves store pre-impregnated wires in three directions separately; and a feeding portion is composed of a motor, pressure rollers and brackets, where the brackets are similar to those in the storage portion, four transverse brackets are sheathed with four rollers, every rollers constitute a group and are distributed up and down, the lower roller of each group is a driving wheel, the stepper motor is connected through a coupling to achieve power input, the upper roller is a driven wheel, and the two rollers roll and transport raw materials. A meshing position of each group of rollers in the storage portion is on the same height as upper surfaces of the rollers in the storage portion. A guide portion is composed of small rollers and brackets, each small roller is on the same straight line as the storage roller groove, and the height of each small roller is determined by the longitudinal beam forming unit.

Figure 3:
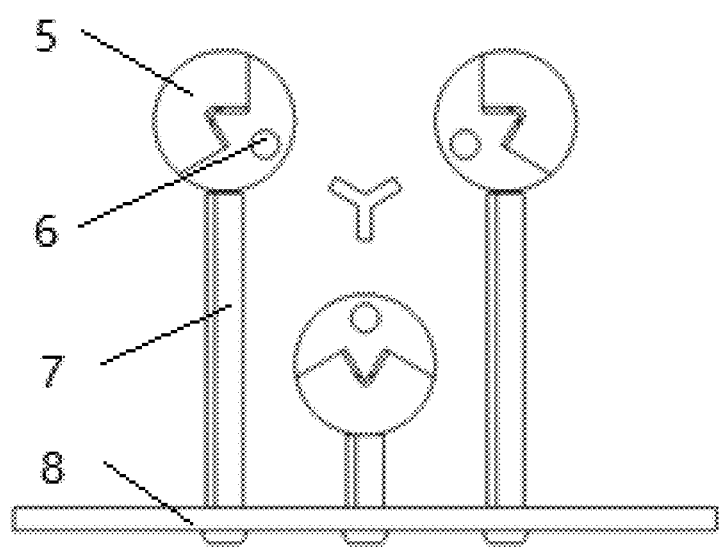
FIG. 3 is a cross-sectional view of a longitudinal beam forming unit mold.

As shown in FIG. 3, the longitudinal beam forming unit includes three mold sets, which are arranged in a triangle; each mold set includes several molds 5, heating rods 6, a ceramic tube 7 and a support plate 8, and is connected to the support plate 8 through the ceramic tube 7; the heating rods 6 are mounted in holes of the molds 5; each mold 5 has an upper mold structure and a lower mold structure, which form a V-shaped angle; the V-shaped angle in each mold set gradually decreases from front to back; a gap between a concave wheel I 23 and a convex wheel I 25 is 0.2 mm to 3 mm; and a gap between a concave wheel II 30 and a convex wheel II 28 is 0.2 mm to 3 mm. Each mold set includes three molds 5; the V-shaped angles in the mold sets are 120°, 90°, and 60°, respectively; the concave wheel I 23 and the concave wheel II 30 are recessed in a 60° V shape; and the convex wheel I 25 and the convex wheel II 28 are raised in a 60° V shape.

Angles between flow channels of the molds are different, so that the 1800 pre-impregnated tapes passing through the molds gradually transform into required longitudinal beams with an angle of 60°.

Figure 4:
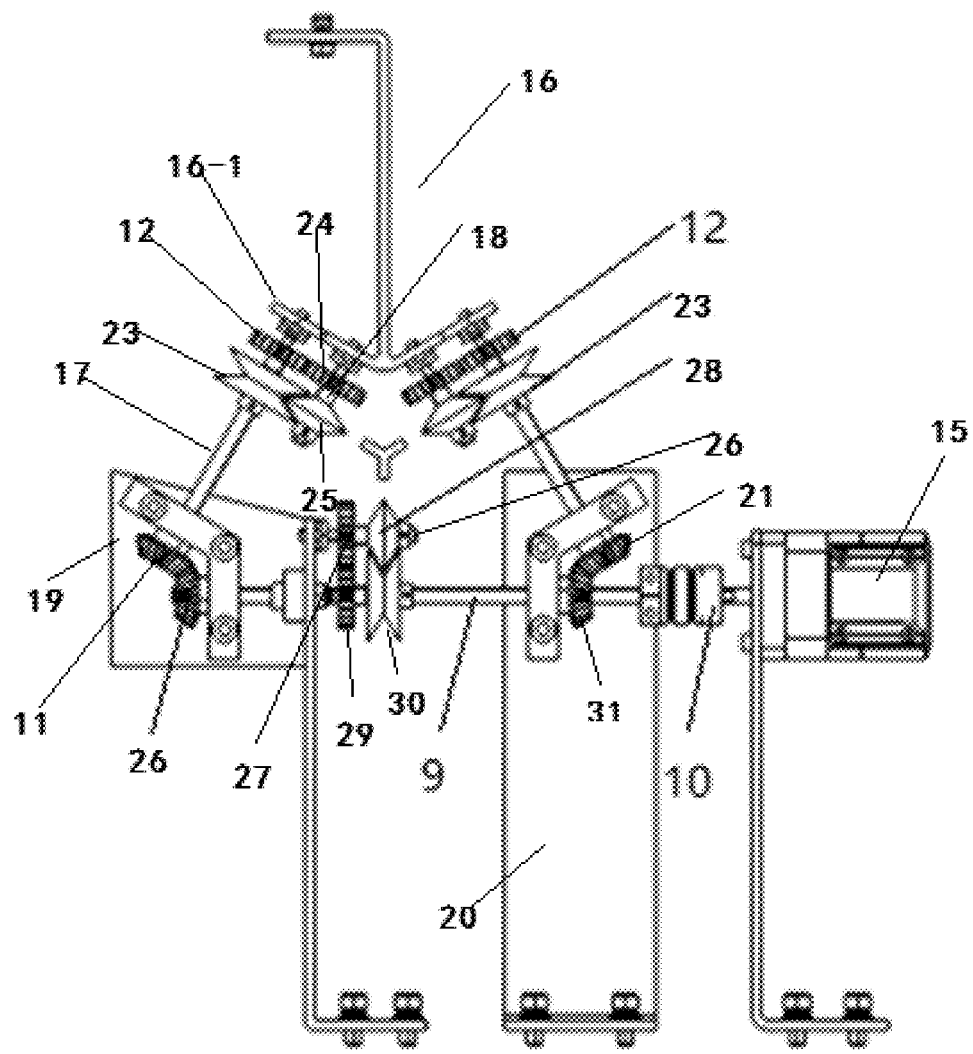
FIG. 4 is a schematic diagram of a longitudinal beam traction unit.
Figure 5:
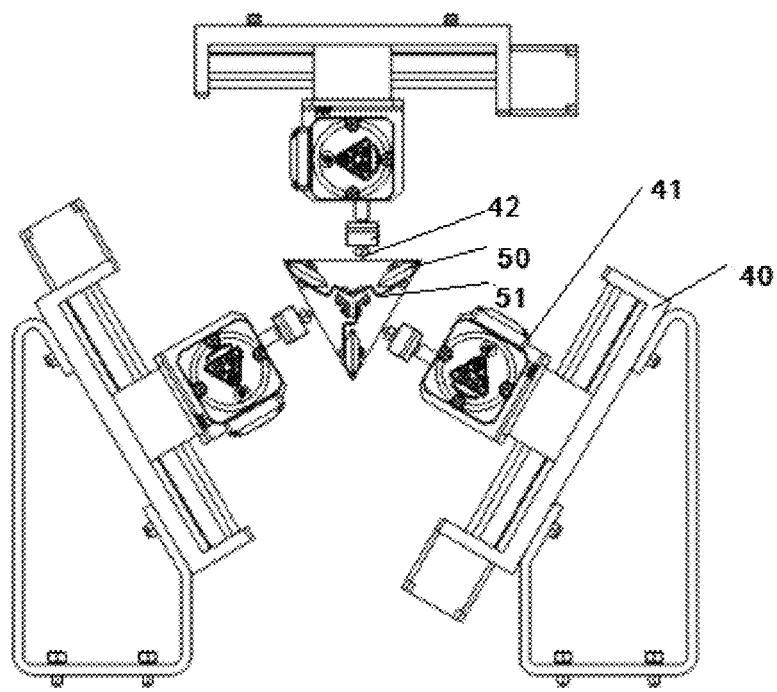
FIG. 5 is a schematic diagram of a cross beam printing and truss support unit.
Figure 6:
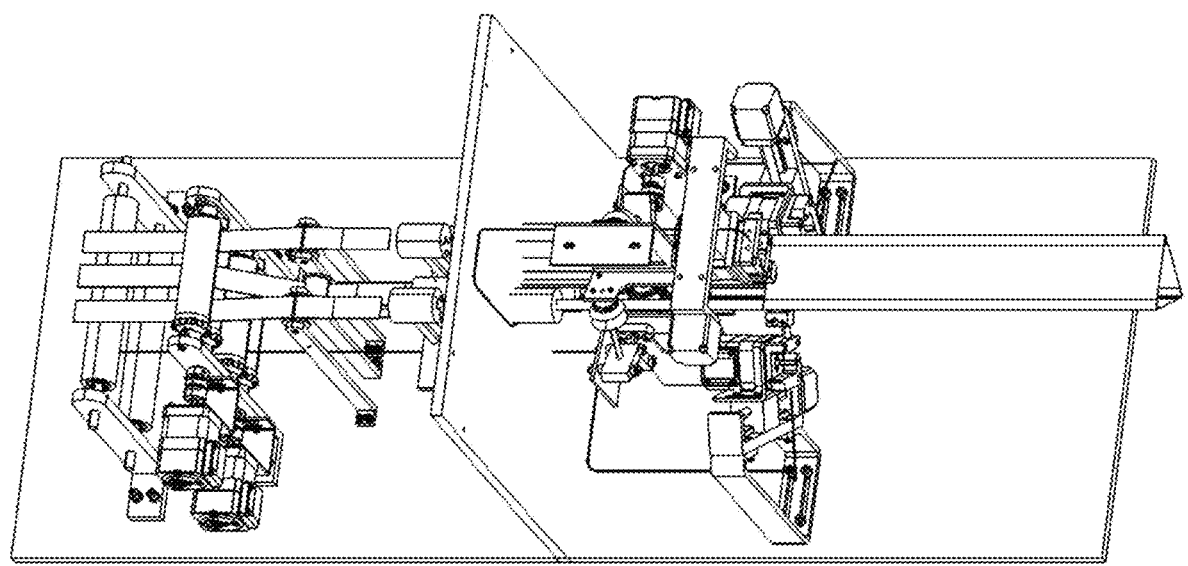
FIG. 6 is a schematic diagram of an overall structure.

As shown in FIG. 4, the longitudinal beam traction unit includes a traction stepper motor 15, a coupling 10, a transmission shaft 9 and an upper support frame 16; wing plates 16-1 are distributed on two sides of the upper support frame 16; an angle between each wing plate 16-1 and a middle plate of the upper support frame 16 is 60°, and each wing plate 16-1 has two through holes for fixing an upper power output shaft 17 and an upper driven shaft 18 that are arranged in parallel; the other end of the left upper power output shaft 17 is arranged on a left support plate 19 and connected to a bevel gear I 11; the other end of the right upper power output shaft 17 is arranged on a right support plate 20 and connected to a bevel gear II 21; a gear I 12 and the concave wheel I 23 are sequentially arranged on each upper power output shaft 17; a gear II 24 and the convex wheel I 25 that cooperate with the gear I 12 and the concave wheel I 23 are sequentially arranged on the upper driven shaft 18; the stepper motor 15 is connected to the transmission shaft 9 through the coupling 10; the transmission shaft 9 is sequentially mounted on the left support plate 19 and the right support plate 20; a bevel gear III 26 and a bevel gear 31 that mesh with the bevel gear I 11 and the bevel gear II 21 separately are sequentially arranged on the transmission shaft 9; a lower driven shaft 26 parallel to the transmission shaft 9 is mounted on the left support plate 19; a gear III 27 and the convex wheel II 28 are sequentially arranged on the lower driven shaft 26; the gear III 27 and the convex wheel II 28 cooperate with a gear IV 29 and a concave wheel II 30 on the transmission shaft 9 separately; and a center line of the convex wheel II 28 is coaxial with a center of the middle plate of the upper support frame 16.

The stepper motor in the longitudinal beam traction unit is connected to one of the transmission shafts through the coupling, and the transmission shafts are driven by the bevel gears, so that the stepper motor drives the driven shafts to move. Spur gears on the transmission shafts drive the gears on the driven shafts, so that convex and concave rollers move simultaneously to pull printed truss longitudinal beams.

The cross beam forming unit is composed of a motion module and a printing module; the truss support unit is composed of support conveying rollers 50 and a support frame 51; a support conveying roller 50 is arranged at each end of the support frame 51; and a shape of the support conveying rollers 50 matches an inner surface of the truss longitudinal beam. The printing module is arranged on a slider of the motion module 40; the motion module 40 is a screw linear guide mechanism; and the printing module includes a printing assembly 41 and a nozzle 42 arranged on the printing assembly 41.

The motion module of the cross beam forming unit is fixed to the device through a bracket, and is parallel to three sides of the truss. When the longitudinal beams are formed, the motion module moves simultaneously, and the printing module on the motion module works to print a cross beam between the two longitudinal beams.

The technical means disclosed in the solution of the present invention are not limited to the technical means disclosed in the foregoing implementations, and further include technical solutions constituted by any combination of the above technical features.

What is claimed is:

1. An additive manufacturing device for an aerospace truss, comprising a raw material input unit, a longitudinal beam forming unit, a longitudinal beam traction unit, a cross beam forming unit and a truss support unit arranged sequentially, wherein the raw material input unit comprises an upper roller, a lower roller located below the upper roller, several conveying pressure rollers arranged sequentially from top to bottom, and a guide plate; one end of each of the several conveying pressure rollers is connected to a feeding stepper motor;

the longitudinal beam forming unit comprises three mold sets, which are arranged in a triangle;

each mold set comprises several molds, heating rods, a ceramic tube and a support plate, and is connected to the support plate through the ceramic tube; the heating rods are mounted in holes of the molds; each mold has an upper mold structure and a lower mold structure, which form a V-shaped angle;

the V-shaped angle in each mold set gradually decreases from front to back; and the longitudinal beam traction unit comprises a traction stepper motor, a coupling, a transmission shaft and an upper support frame; wing plates are distributed on two sides of the upper support frame; an angle between each wing plate and a middle plate of the upper support frame is 60°, and each wing plate has two through holes for fixing a left and right upper power output shaft and an upper driven shaft that are arranged in parallel; an end of the left upper power output shaft is arranged on a left support plate and connected to a first bevel gear; an end of the right upper power output shaft is arranged on a right support plate and connected to a second bevel gear; a first gear and a first concave wheel are sequentially arranged on each upper power output shaft; a second gear and a first convex wheel that cooperate with the first gear and the first concave wheel are sequentially arranged on the upper driven shaft; the stepper motor is connected to the transmission shaft through the coupling; the transmission shaft is sequentially mounted on the left support plate and the right support plate; a third bevel gear and a fourth bevel gear that mesh with the first bevel gear and the second bevel gear separately are sequentially arranged on the transmission shaft; a lower driven shaft parallel to the transmission shaft is mounted on the left support plate; a third gear and a second convex wheel are sequentially arranged on the lower driven shaft; the third gear and the second convex wheel cooperate with a fourth gear and a second concave wheel on the transmission shaft separately; a center line of the second convex wheel is coaxial with a center of the middle plate of the upper support frame; the cross beam forming unit is composed of a motion module and a printing module; the truss support unit is composed of support conveying rollers and a support frame with two ends; a support conveying roller is arranged at each end of the support frame with two ends; and a shape of the support conveying rollers matches an inner surface of a truss longitudinal beam.

2. The additive manufacturing device for the aerospace truss according to claim 1, wherein the printing module is arranged on a slider of the motion module; the motion module is a screw linear guide mechanism; and the printing module comprises a printing assembly and a nozzle arranged on the printing assembly.

3. The additive manufacturing device for the aerospace truss according to claim 1, wherein three cross beam forming units are configured; and the three cross beam forming units are parallel to three sides of the truss and perpendicular to the longitudinal beams of the truss.

4. The additive manufacturing device for the aerospace truss according to claim 1, wherein a gap between the first concave wheel and the first convex wheel is 0.2 mm to 3 mm; and a gap between the second concave wheel and the second convex wheel is 0.2 mm to 3 mm.

5. The additive manufacturing device for the aerospace truss according to claim 1, wherein each mold set comprises three molds; and the V-shaped angles in the mold sets are 120°, 90°, and 60°, respectively.

6. The additive manufacturing device for the aerospace truss according to claim 1, wherein the first concave wheel and the second concave wheel are recessed in a 60° V shape; and the first convex wheel and the second convex wheel are raised in a 60° V shape.

7. The additive manufacturing device for the aerospace truss according to claim 1, wherein rubber layers are arranged on surfaces of the first concave wheel and the second concave wheel;

and rubber layers are arranged on surfaces of the first convex wheel and the second convex wheel.

8. The additive manufacturing device for the aerospace truss according to claim 1, further comprising a left support frame and a right support frame, wherein the upper support frame, the left support frame and the right support frame are all made of carbon fiber boards.

9. The additive manufacturing device for the aerospace truss according to claim 1, wherein the coupling is an elastic coupling.

\* \* \* \* \*